United States Patent
Kuno

(10) Patent No.: US 10,960,683 B2
(45) Date of Patent: Mar. 30, 2021

(54) IMAGE FORMING APPARATUS AND IMAGE FORMING METHOD

(71) Applicant: DGSHAPE CORPORATION, Hamamatsu (JP)

(72) Inventor: Tsutomu Kuno, Hamamatsu (JP)

(73) Assignee: DGSHAPE CORPORATION, Hamamatsu (JP)

(*) Notice: Subject to any disclaimer, the term of this patent is extended or adjusted under 35 U.S.C. 154(b) by 0 days.

(21) Appl. No.: 16/700,787

(22) Filed: Dec. 2, 2019

(65) Prior Publication Data
US 2020/0189291 A1    Jun. 18, 2020

(30) Foreign Application Priority Data
Dec. 17, 2018   (JP) ............................... JP2018-235590

(51) Int. Cl.
| B41J 2/44 | (2006.01) |
|---|---|
| B41J 2/45 | (2006.01) |
| B41J 2/47 | (2006.01) |
| B41J 2/48 | (2006.01) |
| B23K 26/08 | (2014.01) |

(52) U.S. Cl.
CPC ............. *B41J 2/48* (2013.01); *B23K 26/0876* (2013.01); *B41J 2/442* (2013.01); *B41J 2/45* (2013.01); *B41J 2/47* (2013.01)

(58) Field of Classification Search
CPC ....... B41J 2/442; B41J 2/45; B41J 2/47; B41J 2/48
See application file for complete search history.

(56) References Cited

U.S. PATENT DOCUMENTS

| 5,045,866 A * | 9/1991 | Chiba | .................. G06K 15/028 347/232 |
|---|---|---|---|
| 5,428,374 A * | 6/1995 | Kim | ......................... B41J 11/42 347/264 |

FOREIGN PATENT DOCUMENTS

JP         2004-001043 A     1/2004

* cited by examiner

*Primary Examiner* — Matthew Luu
*Assistant Examiner* — Kendrick X Liu
(74) *Attorney, Agent, or Firm* — Knobbe, Martens, Olson & Bear, LLP

(57) ABSTRACT

An image forming apparatus includes an oscillator configured to oscillate a laser beam, an irradiation portion configured to radiate the laser beam oscillated by the oscillator to an outside, a light absorption unit configured to absorb the laser beam and to convert the laser beam to heat, and a control unit. The control unit is configured to control, in an irradiation state, the irradiation portion to press the irradiation portion against a workpiece with first pressing force via the light absorption unit and irradiate the workpiece with the laser beam. The control unit is configured to control, in a non-irradiation state, the radiation portion to press the irradiation portion against the workpiece with second pressing force smaller than the first pressing force via the light absorption unit, or to separate the irradiation portion from the light absorption unit so as to set the second pressing force to zero.

5 Claims, 8 Drawing Sheets

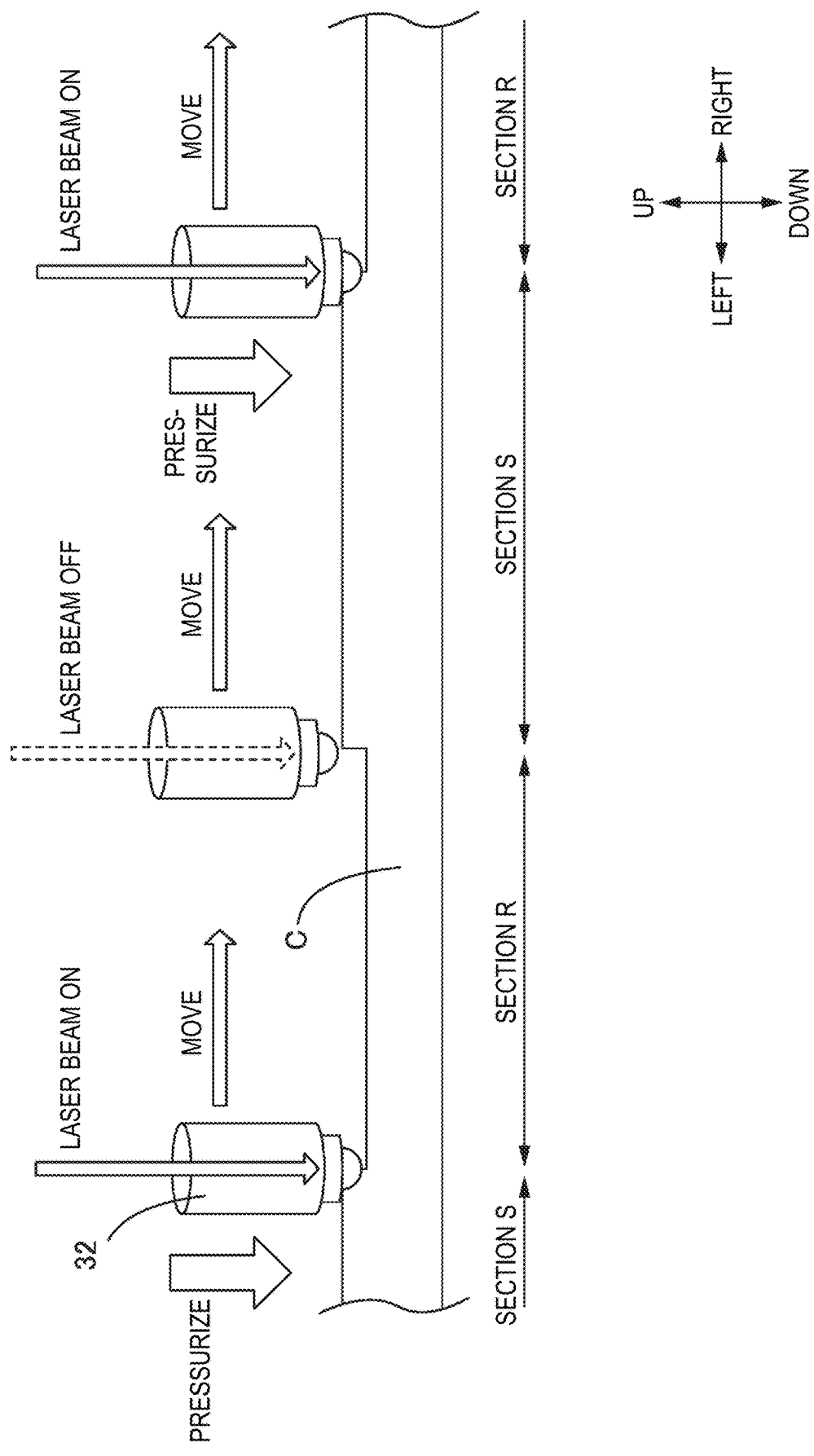

ated a laser beam to heat, and irradiating the workpiece with the laser beam, and in a non-irradiation state in which the irradiation portion is not radiating the laser beam, pressing the irradiation portion against the workpiece with second pressing force smaller than the first pressing force, or separating the irradiation portion from the light absorption unit so as to set the second pressing force to zero.

IMAGE FORMING APPARATUS AND IMAGE FORMING METHOD

CROSS REFERENCE TO RELATED APPLICATION

This application claims priority to Japanese Patent Application No. 2018-235590 filed on Dec. 17, 2018, the entire contents of which are incorporated herein by reference.

BACKGROUND OF THE INVENTION

1. Field of the Invention

The present invention relates to an image forming apparatus and an image forming method.

2. Description of Related Art

A related art image forming apparatus or an image forming method includes an irradiation portion that irradiates a workpiece with a laser beam and forms an image on a surface of the workpiece (see, for example, JP2004-001043A).

When an image is formed using the image forming method or the image forming apparatus, there is concern that the formed image may be unclear due to unevenness of the surface of the workpiece, a change in material, or the like. On the other hand, when the irradiation portion is strongly pressed against the workpiece to make the image clear, there is concern that an unnecessary scratch may be formed on the workpiece.

SUMMARY

One or more embodiments of the present invention provide an image forming method or an image forming apparatus capable of preventing an unnecessary scratch on a workpiece when an image is formed.

In an aspect (1), one or more embodiments of the present invention provide an image forming apparatus, the image forming apparatus includes an oscillator configured to oscillate a laser beam, an irradiation portion configured to radiate the laser beam oscillated by the oscillator to an outside, a light absorption unit configured to absorb the laser beam and to convert the laser beam to heat, and a control unit including at least one processor and at least one memory. The control unit is configured to control, in an irradiation state in which the irradiation portion is radiating the laser beam, the irradiation portion to press the irradiation portion against a workpiece with first pressing force via the light absorption unit and irradiate the workpiece with the laser beam. The control unit is configured to control, in a non-irradiation state in which the irradiation portion is not radiating the laser beam, the irradiation portion to press the irradiation portion against the workpiece with second pressing force smaller than the first pressing force via the light absorption unit, or to separate the irradiation portion from the light absorption unit so as to set the second pressing force to zero.

In an aspect (2), one or more embodiments of the present invention provide an image forming method of forming an image on a workpiece by using an irradiation portion radiating a laser beam to an outside, the image forming method includes in an irradiation state in which the irradiation portion is radiating the laser beam, pressing the irradiation portion against a workpiece with first pressing force via a light absorption unit absorbing the laser beam and con-

BRIEF DESCRIPTION OF THE DRAWINGS

FIG. 7 is a cross-sectional view of the workpiece along the scanning path according to the embodiment, and schematically shows image forming processing.

DETAILED DESCRIPTION

Figure 1:
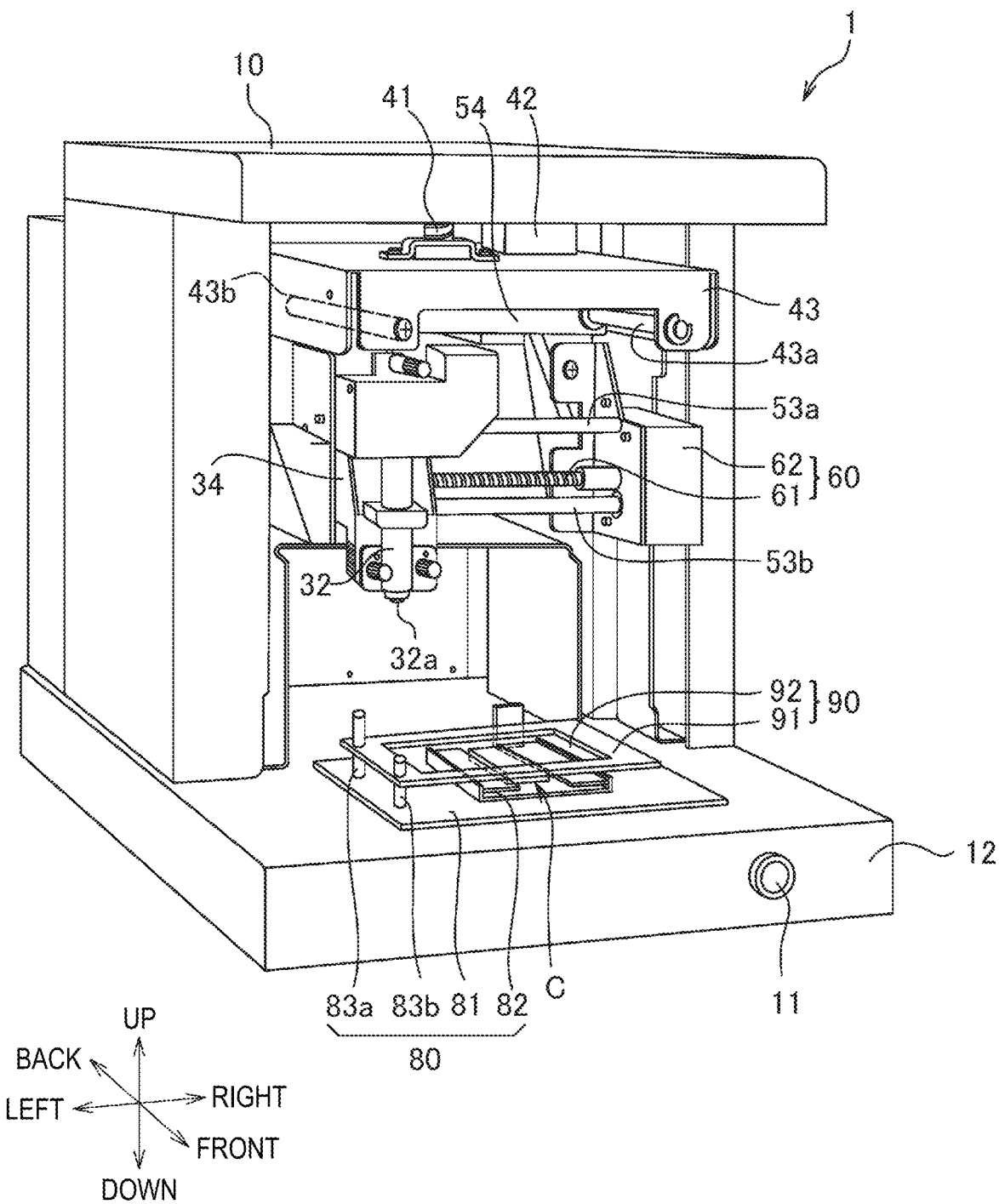
FIG. 1 is an external perspective view showing an image forming apparatus according to an embodiment.

An image forming apparatus 1 according to an embodiment of the present invention will be described with reference to FIG. 1 to FIG. 8. The image forming apparatus 1 according to the present embodiment causes a laser beam to scan a workpiece C to form an image on the workpiece C. As shown in FIG. 1 to FIG. 4, the image forming apparatus 1 includes a case 10, a control unit 20, an image forming unit 30, an up-down direction drive mechanism 40, a front-back direction drive mechanism 50, a left-right direction drive mechanism 60, a pressing sensor 70, an installation unit 80, and a light absorption unit 90. The image forming apparatus 1 is communicably connected to an external computer 2. The image forming apparatus 1 itself may have a function of the computer 2.

The computer 2 creates data of a scanning path along a shape of a predetermined pattern (for example, a contour of a character) and transmits the data to the image forming apparatus 1. As the computer 2, for example, a general personal computer can be used. The scanning path is created by using a predetermined program installed in the computer 2 in advance.

[Case]

Figure 2:
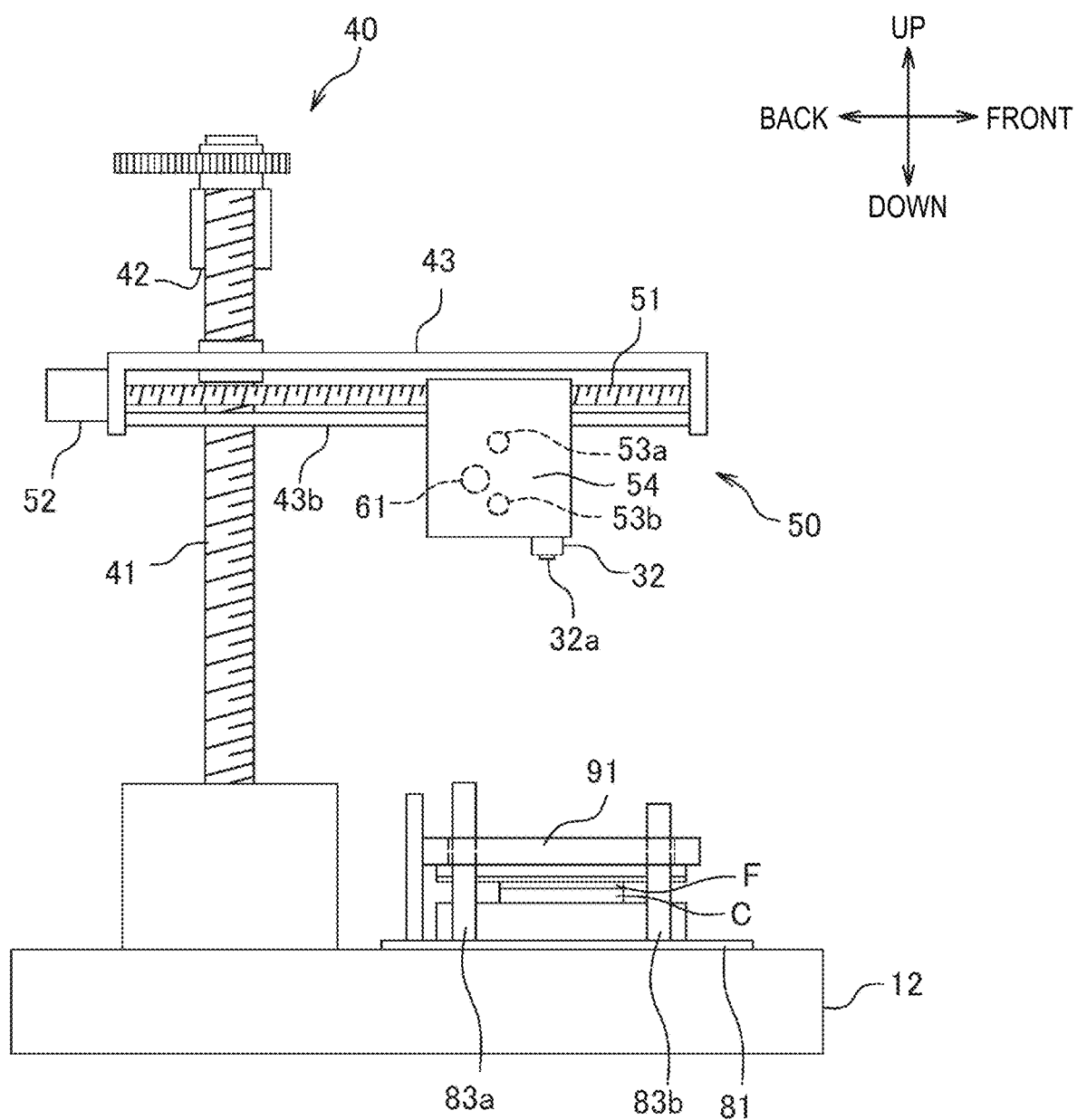
FIG. 2 is a left side view schematically showing a drive mechanism according to the embodiment.

As shown in FIG. 1 and FIG. 2, the case 10 includes a base portion 12. The base portion 12 is provided with a power switch 11 electrically connected to the control unit 20. The installation unit 80 is fixed to an upper surface of the base portion 12.

In the present embodiment, as shown in FIG. 1, directions of front, back, left and right, and up and down directions are defined. Specifically, a direction in which the power switch 11 is provided with respect to the case 10 is set as the front, and an opposite direction thereof is set as the back. In addition, the directions of left and right are defined with reference to a case in which the case 10 is viewed from the front. In the case 10, a side where the base portion 12 is disposed is set as a down side, and an opposite side thereof is set as an upside.

[Image Forming Unit]

As shown in FIG. 1 to FIG. 4, the image forming unit 30 is provided in the case 10. The image forming unit 30 includes a laser oscillator 31, an irradiation portion 32, an optical fiber 33, and a carriage 34.

Figure 3:
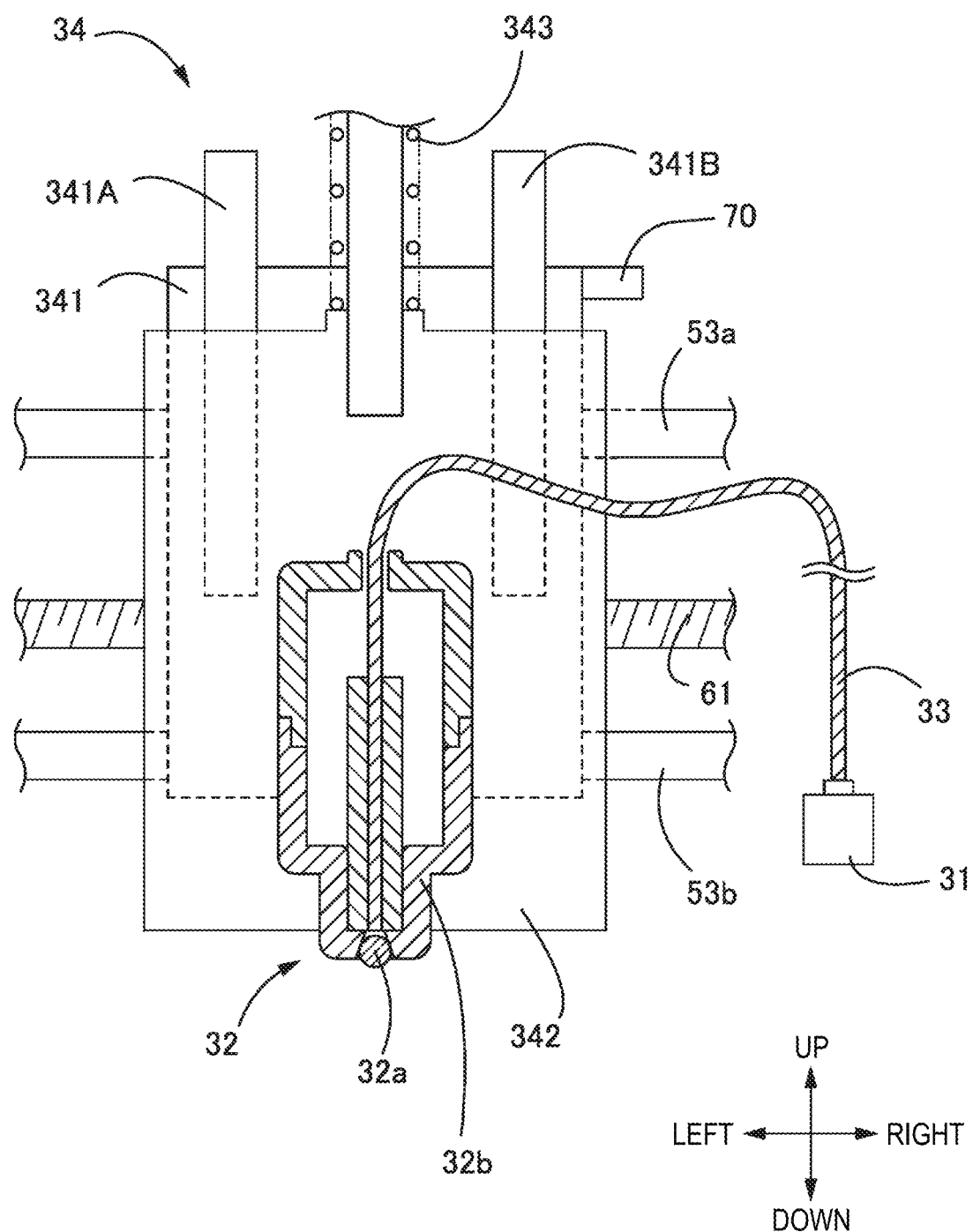
FIG. 3 schematically shows an image forming unit according to the embodiment.

The laser oscillator 31 is a semiconductor laser oscillator (FIG. 3). Since a predetermined current flows to the laser oscillator 31, a laser beam is oscillated from the laser oscillator 31. Performance of the laser oscillator 31 is, for example, 450 nm in wavelength and 1 W at the maximum output. The laser oscillator 31 is not limited to a semiconductor laser, and may be a solid laser or a gas laser such as a carbon dioxide laser.

As shown in FIG. 3, the irradiation portion 32 is connected via the laser oscillator 31 and the optical fiber 33. The irradiation portion 32 includes a lens 32a and a substantially cylindrical member 32b that supports the lens 32a at a lower portion and extends up and down.

In the present embodiment, the lens 32a is formed in a spherical shape and is formed of a material through which a laser beam is transmitted. The lens 32a is not limited to a spherical shape, and may be a lens shape or a hemispherical shape. The laser beam oscillated from the laser oscillator 31 is transmitted to the irradiation portion 32 via the optical fiber 33 and is radiated to the outside via the lens 32a. Image formation is performed by pressing the lens 32a against the workpiece C via the light absorption unit 90 and irradiating the workpiece C with a laser beam.

As shown in FIG. 3, the carriage 34 includes a back member 341, a front member 342 supporting the irradiation portion 32, and a biasing member 343.

The back member 341 is a member having a substantially rectangular parallelepiped shape, and is supported to be drivable by the left-right direction drive mechanism 60, the front-back direction drive mechanism 50, and the up-down direction drive mechanism 40. By these drive mechanisms, the carriage 34 and the irradiation portion 32 supported by the carriage 34 can move relatively to the workpiece C in a three-dimensional direction, that is, can scan the workpiece C.

The back member 341 includes two parallel slide bars 341A and 341B. The slide bars 341A and 341B are fixed to a front surface portion of the back member 341 separately so as to extend in the up-down direction. The slide bars 341A and 341B engage with the front member 342 and support the front member 342 to be slidable in the up-down direction.

The front member 342 is a substantially rectangular parallelepiped member and is located in front of the back member 341. The front member 342 is slidably supported by the slide bars 341A and 341B, and is movable in the up-down direction with respect to the back member 341. The front member 342 supports and fixes the irradiation portion 32 at a front portion thereof.

The biasing member 343 is a coil spring disposed so as to extend in the up-down direction. A lower end portion of the biasing member 343 is fixed to an upper portion of the front member 342, and an upper end portion thereof is fixed to the back member 341. The biasing member 343 has a function of biasing and pressing the front member 342 downward by its own restoring force. The biasing member 343 is not limited to the coil spring, and may be another biasing means, member, or the like.

[Press Sensor]

Figure 4:
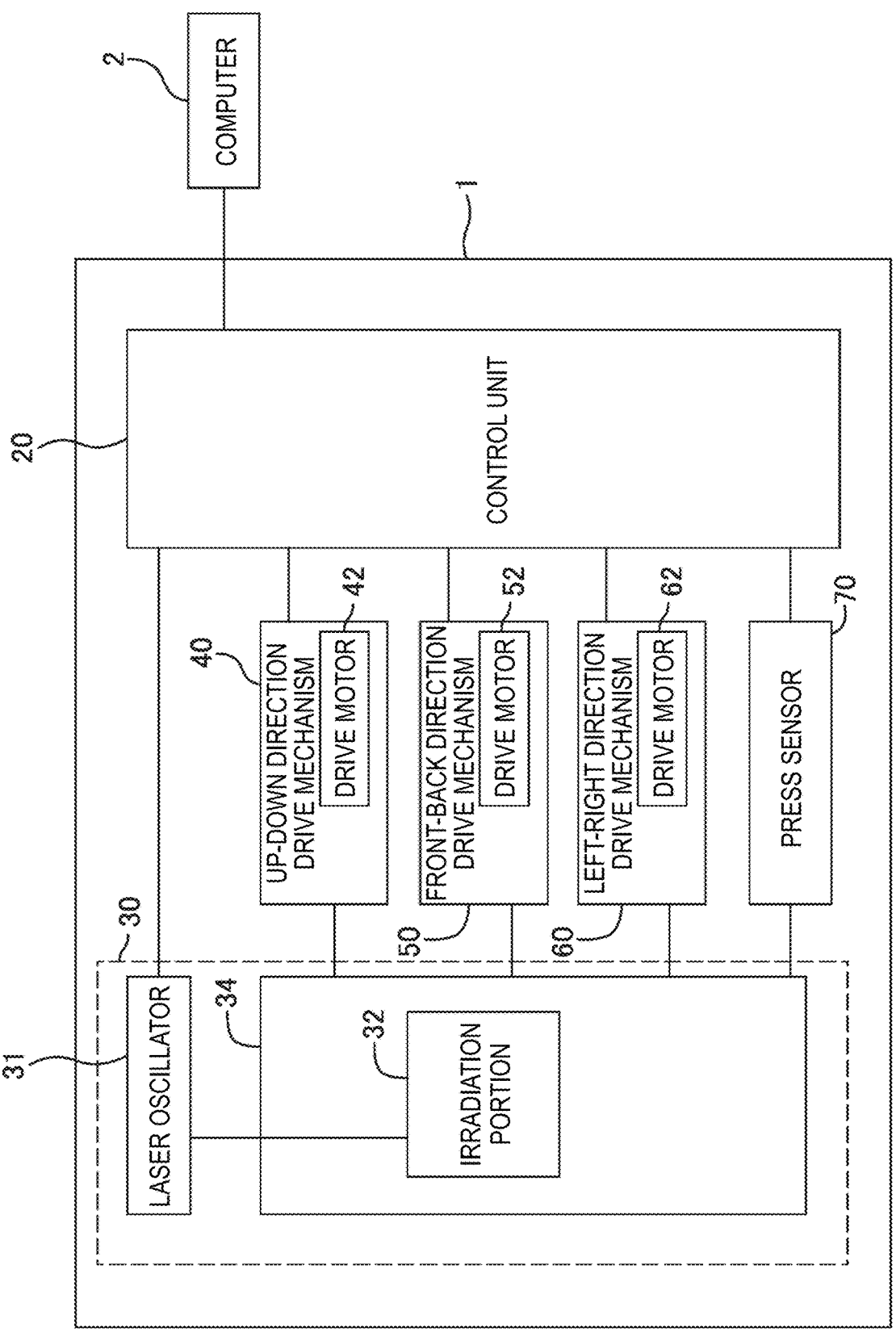
FIG. 4 is a block diagram showing a functional connection of the image forming apparatus according to the embodiment.

The press sensor 70 is attached to the back member 341 and has a function of measuring a relative distance between the back member 341 and the front member 342 in the up-down direction. The press sensor 70 can calculate pressing force which the biasing member 343 applies to the front member 342 by considering the relative distance and a spring constant of the biasing member 343. The press sensor 70 electrically connects with the control unit 20 as shown in FIG. 4, and can transmit the measured pressing force to the control unit 20. The press sensor 70 may transmit the relative distance between the back member 341 and the front member 342 to the control unit 20, and the control unit 20 may calculate the pressing force. The press sensor 70 may be, for example, a photoelectric sensor, or may measure the relative distance between the back member 341 and the front member 342 by using a mechanical means.

[Up-Down Direction Drive Mechanism]

As shown in FIG. 1 and FIG. 2, the up-down direction drive mechanism 40 includes an up-down direction drive shaft 41, a drive motor 42, and an elevation base 43. The up-down direction drive shaft 41 extends in the up-down direction, and is threaded in a spiral shape. An upper portion of the up-down direction drive shaft 41 is rotatably supported by the case 10, and a lower end portion thereof is rotatably supported by the base portion 12. The drive motor 42 is fixed to an upper portion of the case 10 and is electrically connected with the control unit 20. An output shaft of the drive motor 42 mechanically connects with the up-down direction drive shaft 41, and the up-down direction drive shaft 41 can be rotationally driven.

The elevation base 43 is a member extending in a horizontal direction, and is rotatably supported by an up and down extending slide shaft (not shown). The elevation base 43 is screwed with the up-down direction drive shaft 41. The elevation base 43 moves in the up-down direction since the up-down direction drive shaft 41 rotates. The elevation base 43 includes slide shafts 43a and 43b extending in the front-back direction.

[Front-Back Direction Drive Mechanism]

The front-back direction drive mechanism 50 includes a front-back direction drive shaft 51, a drive motor 52, and a slide base 54. The front-back direction drive shaft 51 is provided on the elevation base 43 so as to extend in the front-back direction, and is threaded in a spiral shape. The drive motor 52 is fixed to a back portion of the elevation base 43 and is electrically connected to the control unit 20. An output shaft of the drive motor 52 is connected with a back end portion of the front-back direction drive shaft 51, and can rotationally drive the front-back direction drive shaft 51.

The slide base 54 is screwed with the front-back direction drive shaft 51. The slide base 54 is rotatably supported by the slide shafts 43a and 43b. When the drive motor 52 is driven, the slide base 54 moves in the front-back direction by rotation of the front-back direction drive shaft 51. The slide base 54 includes slide shafts 53a and 53b extending in the left-right direction.

[Left-Right Direction Drive Mechanism]

The left-right direction drive mechanism 60 is coupled with the slide base 54. The left-right direction drive mechanism 60 includes a left-right direction drive shaft 61 and a drive motor 62. The left-right direction drive shaft 61 extends in the left-right direction, and is threaded in a spiral shape. An output shaft of the drive motor 62 mechanically connects with a right end portion of the left-right direction drive shaft 61, and the left-right direction drive shaft 61 can be rotationally driven. The drive motor 62 is electrically connected with the control unit 20.

The left-right direction drive shaft 61 is screwed to the back member 341 of the carriage 34. The slide shafts 53*a* and 53*b* rotatably support the back member 341. When the drive motor 62 is driven, the left-right direction drive shaft 61 rotates, and the back member 341 is driven in the left-right direction along the slide shafts 53*a* and 53*b*.

[Installation Unit]

As shown in FIG. 1 and FIG. 2, the installation unit 80 includes a flat plate-shaped pedestal 81 fixed on the base portion 12, a fixture 82 detachably fixed on the pedestal 81, and support bodies 83*a* and 83*b*. The fixture 82 according to the present embodiment includes a pair of left and right members, and can sandwich the workpiece C. The fixture 82 has a function of fixing the workpiece C on the base portion 12 by sandwiching the workpiece C from the left and right.

The support bodies 83*a* and 83*b* are substantially cylindrical members whose lower end portions are fixed to the pedestal 81 and extend upward. An upper portion of the support 83*a* rotatably supports the light absorption unit 90.

[Light Absorption Unit]

The light absorption unit 90 includes a frame body 91 and a transparent or translucent film 92. The frame body 91 is a rectangular frame-shaped member in a top view, and supports the film 92. The film 92 has a function of absorbing a beam such as a laser beam and converting the beam to heat.

Figure 5A:
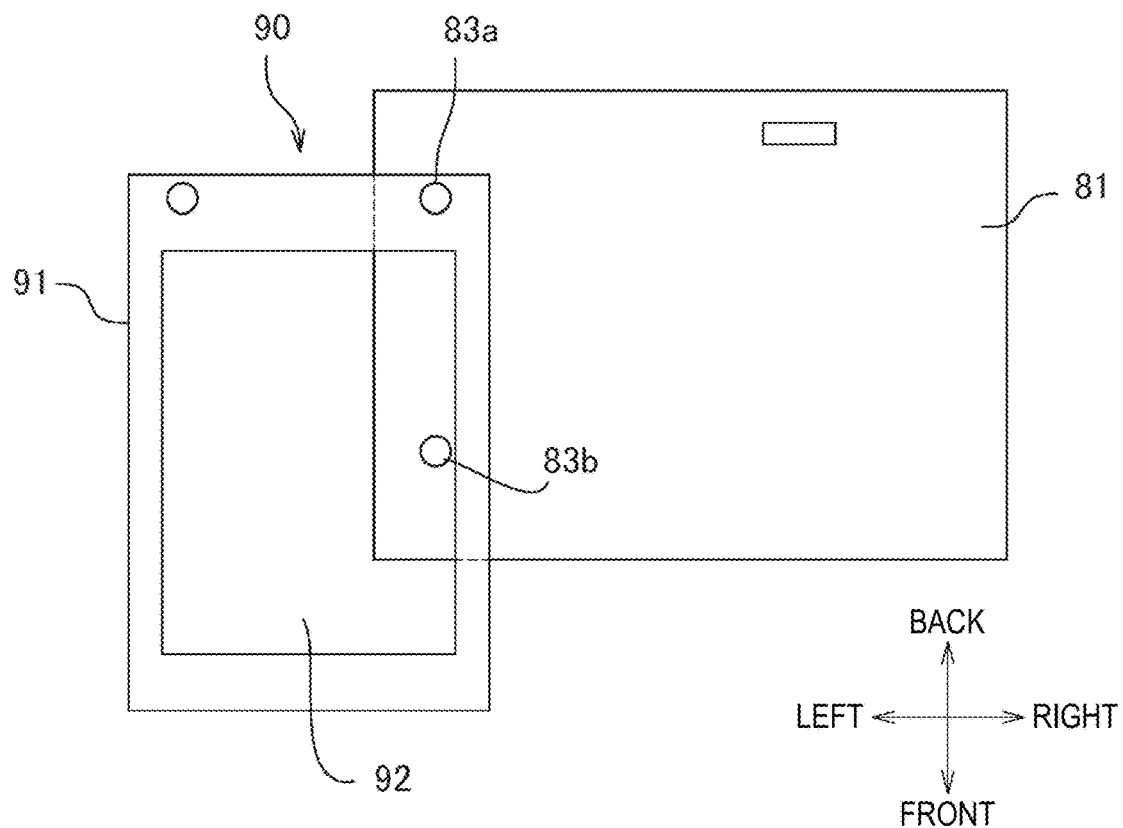
FIG. 5A is a top view showing a light absorption unit disposed at a preparation position and an installation unit according to the embodiment.
Figure 5B:
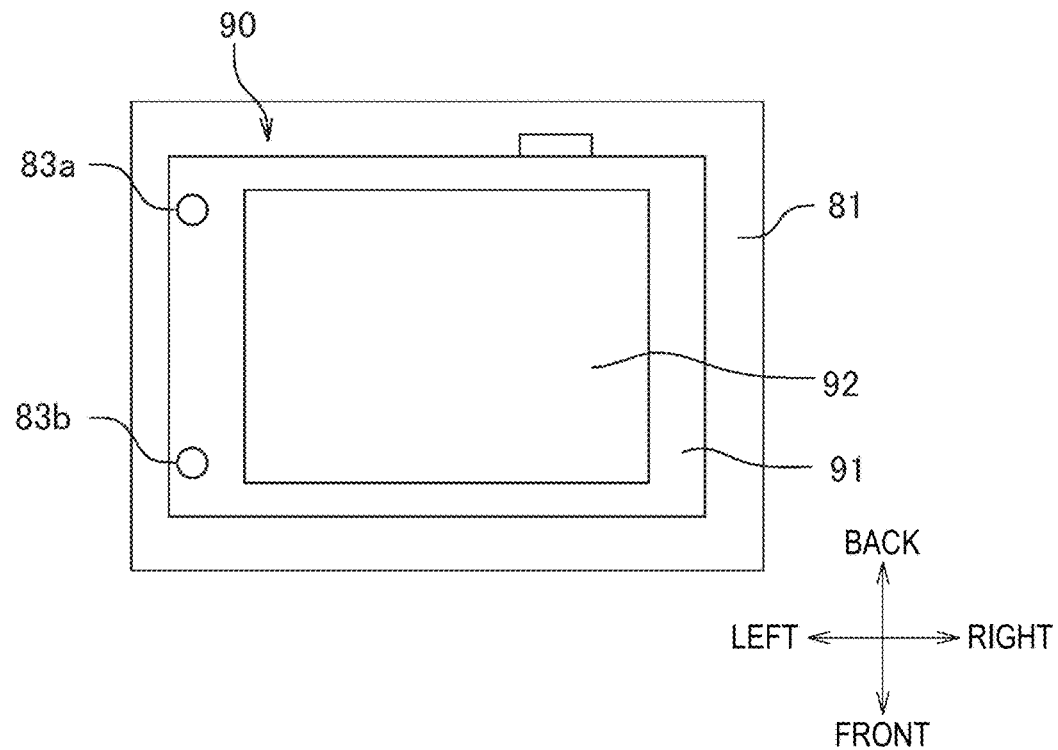
FIG. 5B is a top view showing the light absorption unit disposed at an installation position and the installation unit according to the embodiment. In order to facilitate understanding, illustration of a fixture is omitted.

As shown in FIGS. 5A and 5B, the light absorption unit 90 is rotatably supported by the support body 83*a*, and can rotate to substantially horizontal between a preparation position (FIG. 5A) and an installation position (FIG. 5B). When the light absorption unit 90 is disposed at the installation position, the frame body 91 engages with the support body 83*b*, so that the light absorption unit 90 is fixed to the installation position.

[Workpiece]

A surface of the workpiece C is formed of a material having a property of discoloring by heating. Therefore, when an image is formed on the workpiece C, it is possible to adjust image density by adjusting an amount of energy, that is, an amount of heat supplied to the workpiece C. Examples of the surface material of the workpiece C include leather such as case leather.

[Control Unit]

An overall operation of the image forming apparatus 1 is controlled by the control unit 20. A configuration of the control unit 20 is not particularly limited, but mainly includes a ROM that stores a program, a CPU that performs a program, a RAM that provides a work area in processing by the CPU, and an NVRAM that is a nonvolatile memory and stores various data in the present embodiment.

As shown in FIG. 4, the control unit 20 has a function of electrically connecting and controlling the laser oscillator 31 of the image forming unit 30. Further, the control unit 20 is communicably connected to the up-down direction drive mechanism 40, the front-back direction drive mechanism 50, and the left-right direction drive mechanism 60 and controls them. By controlling these drive mechanisms, the control unit 20 can control a scanning direction, a scanning path, and the number of scanning of the image forming unit 30, and can form an image on the workpiece C.

The control unit 20 performs image forming processing by pressing the irradiation portion 32 against the workpiece C via the film 92 and irradiating the workpiece C with a laser beam from the irradiation portion 32. Pressing force of the irradiation portion 32 against the workpiece C is controlled since the control unit 20 refers to a signal from the press sensor 70.

[Image Forming Processing]

Figure 6A:
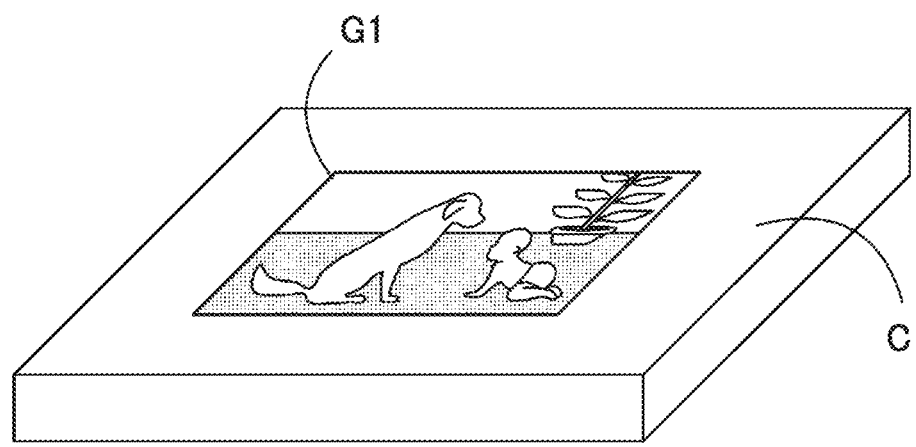
FIG. 6A shows a workpiece and a formed image according to the embodiment.

Processing of forming an image on the workpiece C by using the image forming apparatus 1 will be described in detail below. In order to facilitate understanding, as shown in FIG. 6A, processing of forming an image G1 on the workpiece C is described as a specific example of the image forming processing.

In the image forming processing, a user first disposes the light absorption unit 90 in the preparation position (FIG. 5A). Next, the user fixes the workpiece C so as not to move relatively to the base portion 12 by sandwiching the workpiece C by the fixture 82. Further, the user rotates the light absorption unit 90 from the preparation position to the installation position (FIG. 5B), and completes installation of the workpiece C. When the installation of the workpiece C is completed, the user inputs the image G1 to be formed and instructs start of processing of the control unit 20 by using the computer 2.

Figure 6B:
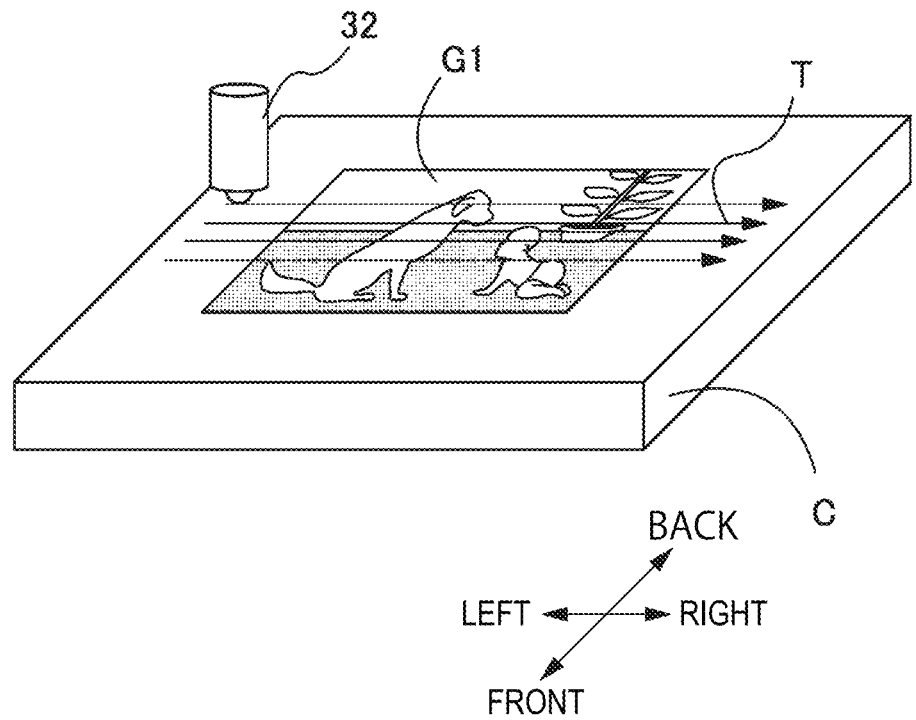
FIG. 6B shows a scanning path of an irradiation portion according to the embodiment.

Upon receiving the instructions from the user, the control unit 20 performs image forming work. As shown in FIG. 6B, the control unit 20 controls the irradiation portion 32 to scan the workpiece C and forms an image. As shown in FIG. 6B, the scanning paths extend in the left-right direction across the image G1, and are set so as to sequentially link each other in the front-back direction. FIG. 7 is a cross-sectional view of the workpiece C cut along a scanning path T extending in the left-right direction. The scanning path T includes a section R that heats and discolors the workpiece C by laser radiation, and a section S that temporarily stops laser radiation and does not discolor the workpiece C.

In the section R, the control unit 20 activates the laser oscillator 31 and sets an irradiation state in which a laser beam is radiated from the lens 32*a* of the irradiation portion 32 to form an image. The laser beam is radiated to the workpiece C through the film 92. A part of the workpiece C that has been irradiated with the laser beam is discolored by being heated, and an image is formed.

Figure 8:
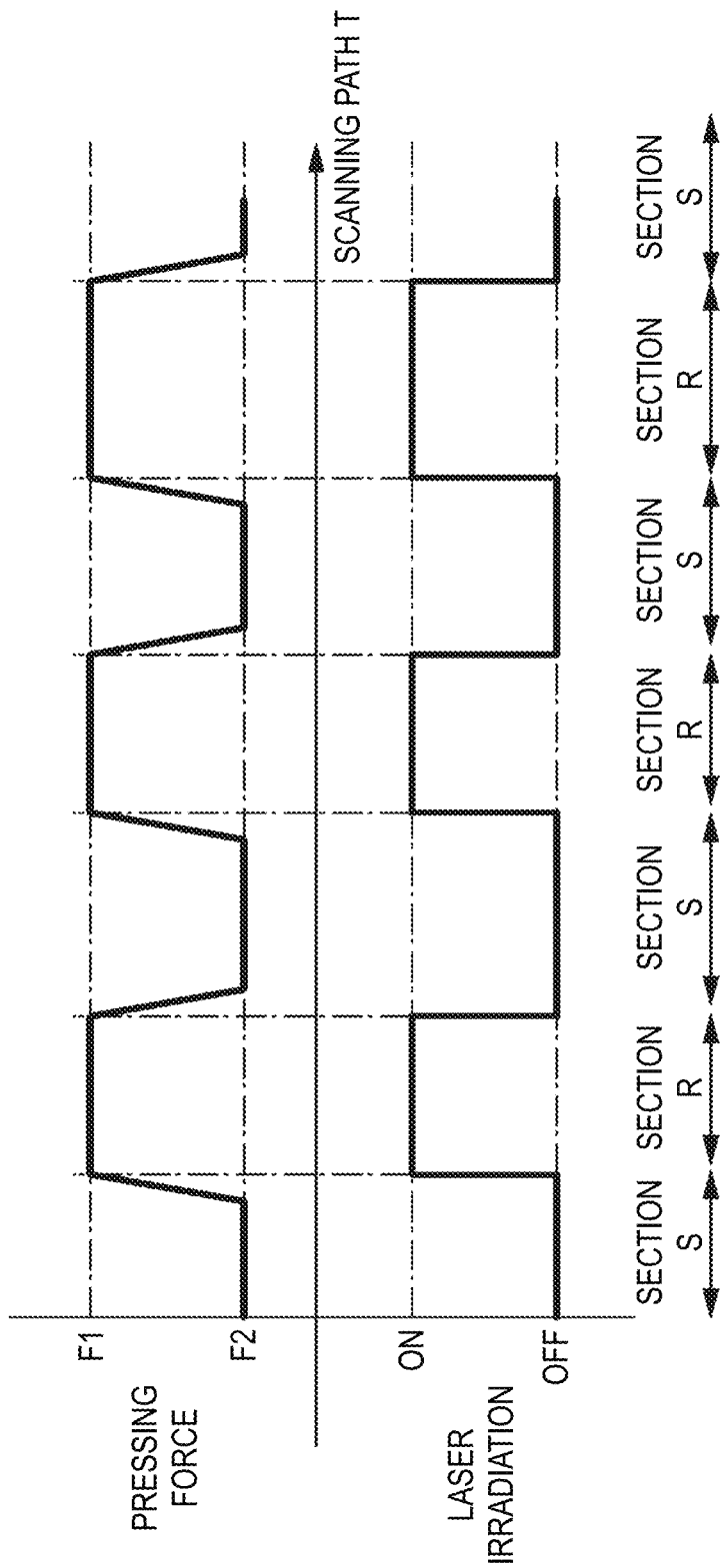
FIG. 8 is a graph showing relation between pressing force and a laser radiation state along the scanning path when the image is formed.

At the same time, the control unit 20 brings the lens 32*a* into contact with the film 92, and presses the lens 32*a* toward the film 92 and the workpiece C by using the biasing member 343 and the up-down direction drive mechanism 40. At this time, the control unit 20 measures the pressing force based on the signal received from the press sensor 70 and controls the pressing force so as to be first pressing force F1 (FIG. 8). In this way, the control unit 20 controls the laser beam to be radiated from the lens 32*a* in a state where the first pressing force F1 is maintained, and to scan the workpiece C till a right end portion of the section R. Here, the first pressing force F1 is preset according to a type of the workpiece C, for example, is set to 4.9 N or more if the workpiece C is leather or the like.

In the section S, the control unit 20 stops the radiation of the laser beam. Specifically, the control unit 20 temporarily stops the laser oscillator 31, so that the laser beam is not radiated from the lens 32*a* of the irradiation portion 32, and the workpiece C is not heated. At the same time, the control unit 20 controls the lens 32*a* to press the workpiece C with second pressing force F2 (FIG. 8) using the biasing member 343 and the up-down direction drive mechanism 40. While maintaining this state, the control unit 20 controls the irradiation portion 32 to scan the workpiece C till the right end portion of the section S.

The second pressing force F2 is smaller than the first pressing force F1. The second pressing force F2 is set so as not to leave scratches or dents in the workpiece C according to the type of the workpiece C or the like. The second pressing force F2 may be zero. That is, the control unit 20 may separate the lens 32a from the workpiece C and the film 92 in the section S.

In this way, the controller 20 forms a predetermined image G1 on the surface of the workpiece C by providing the section R for performing the laser radiation and the section S for stopping the laser radiation in the scanning direction corresponding to the formed image. As described above, since the pressing force is reduced in the section S, a risk that an unnecessary scratch such as abrasion and a trace are left on the workpiece C is prevented or reduced. In addition, since the workpiece C is not directly irradiated but is irradiated through the light absorption unit 90 with the laser beam, generation of fumes during image formation can be reduced or prevented.

In the present embodiment, a configuration in which the laser oscillator 31 is used as a light generator for image formation has been described, but the present invention is not limited to such a configuration. For example, a light emitting diode can be used instead of the laser oscillator 31. In addition, not only the light emitting diode, but also an element or the like capable of changing output of light by changing a current to flow can be used.

In the present embodiment, an example in which only the irradiation portion 32 moves has been described, but the present invention is not limited to such a configuration. That is, image formation may be performed by since the installation unit 80 moves in the front-back direction, the left-right direction, and the up-down direction with respect to the fixed irradiation portion 32. In this case, the up-down direction drive mechanism 40, the front-back direction drive mechanism 50, and the left-right direction drive mechanism 60 have a configuration (for example, a drive motor for moving the installation unit 80 in the three axial directions) that drives the installation unit 80. Alternatively, both the irradiation portion 32 and the installation unit 80 may be moved.

A shape of the case of the workpiece C in the present invention is not limited to a rectangular parallelepiped shape as in the present embodiment, and each side surface may be a curved surface.

The image forming apparatus 1 of the above embodiment includes the laser oscillator 31 that oscillates a laser beam, the irradiation portion 32 that can radiate the laser beam oscillated from the laser oscillator 31 to the outside, the light absorption unit 90 that absorbs the laser beam and converts it to heat, and the control unit 20. In an irradiation state where the irradiation portion 32 radiates the laser beam, the control unit 20 presses the irradiation portion 32 against the workpiece C via the light absorption unit 90 with the first pressing force F1 and irradiates the workpiece C with the laser beam. In a non-irradiation state where the irradiation portion 32 stops radiation of the laser beam, the control unit 20 forms an image by setting pressing force of the irradiation portion 32 against the workpiece C as the second pressing force F2 smaller than the first pressing force F1.

In the above embodiment, an image forming method is adopted in which an image is formed on the workpiece C by using the irradiation portion 32 capable of radiating the laser beam to the outside. In the image forming method, in the irradiation state where the irradiation portion 32 radiates the laser beam, the irradiation portion 32 is pressed against the workpiece C with the first pressing force F1 via the light absorption unit 90 that absorbs the laser beam and converts it to heat, and the workpiece C is irradiated with the laser beam. In the non-irradiation state where the irradiation portion 32 stops radiation of the laser beam, the pressing force of the irradiation portion 32 with respect to the workpiece C is set as the second pressing force F2 smaller than the first pressing force F1.

According to the above configuration, since the laser beam is radiated while the irradiation portion 32 is pressed against the workpiece C, a clear image can be formed without blurring, nonuniformity, or the like on the formed image. In the above configuration, absorptance of light on the workpiece C is made uniform by the light absorption unit 90, and heat supplied to the workpiece C can be homogenized. Therefore, even when the absorptance of the light on the surface of the workpiece C varies depending on the portion, nonuniformity of an image is reduced or prevented. Further, in an irradiated state in which the laser radiation is not performed, since the pressing force against the workpiece C is reduced, a risk that an unnecessary scratch such as abrasion and a trace are left on the workpiece C is prevented or reduced.

The image forming apparatus 1 further includes the up-down direction drive mechanism 40 that causes the irradiation portion 32 to scan the workpiece C, the front-back direction drive mechanism 50, and the left-right direction drive mechanism 60. The control unit 20 controls the irradiation portion 32 to scan a portion where an image is formed on the workpiece C as the irradiation state, and controls the irradiation portion 32 to scan a portion where no image is formed on the workpiece C as the non-irradiation state.

According to the above configuration, a clear image can be formed in the section R in which the image is formed. On the other hand, since the laser radiation is not performed, since the pressing force against the workpiece C is reduced in the section S where no image is formed, a risk that an unnecessary scratch such as abrasion and a trace are left on the workpiece C is prevented or reduced.

The control unit 20 can press the irradiation portion 32 against the workpiece C with force of 4.9 N or more. Even in a case where the workpiece C is a soft material such as leather, it is possible to reduce an influence of unevenness or material change of the surface of the workpiece C during image formation by pressing with force of 4.9 N or more. Therefore, a clear image can be formed.

In the non-irradiation state, the control unit 20 can separate the irradiation portion 32 from the light absorption unit 90 and set the second pressing force F2 to zero. In the section S where no image is formed, since there is completely no pressing force against the workpiece C, there is no risk that an unnecessary scratch such as abrasion and a trace are left on the workpiece C.

In the above embodiment, the laser oscillator 31 includes a semiconductor laser oscillation device. Therefore, it is possible to make the laser oscillator 31 smaller and less power consumed compared with a carbon dioxide laser oscillator or the like.

The above embodiment has been presented as an example of the invention, and does not limit the scope of the invention. Various omissions, substitutions, and changes can be made to the above configuration without departing from the spirit of the invention. The above embodiment and the modification thereof are included in the invention described in the scope of claims and the equivalent scope thereof as well as included in the scope and spirit of the invention.

What is claimed is:

1. An image forming apparatus comprising:
   an oscillator configured to oscillate a laser beam;
   an irradiation portion configured to radiate the laser beam oscillated by the oscillator to an outside;
   a light absorption unit configured to absorb the laser beam and to convert the laser beam to heat; and
   a control unit including at least one processor and at least one memory,
   wherein the control unit is configured to control, in an irradiation state in which the irradiation portion is radiating the laser beam, the irradiation portion to press the irradiation portion against a workpiece with first pressing force via the light absorption unit and irradiate the workpiece with the laser beam, wherein the first pressing force is equal to or greater than 4.9 N, and
   wherein the control unit is configured to control, in a non-irradiation state in which the irradiation portion is not radiating the laser beam, the irradiation portion to press the irradiation portion against the workpiece with second pressing force smaller than the first pressing force via the light absorption unit, or to separate the irradiation portion from the light absorption unit so as to set the second pressing force to zero.

2. The image forming apparatus according to claim 1, further comprising:
   a drive mechanism configured to cause the irradiation portion to scan the workpiece,
   wherein the control unit is configured to control the irradiation portion to be in the irradiation state and to scan a first portion of the workpiece on which an image is to be formed, and
   wherein the control unit is configured to control the irradiation portion to be in the non-irradiation state and to scan a second portion of the workpiece on which no image is to be formed.

3. The image forming apparatus according to claim 1, wherein the control unit is configured to control, in the non-irradiation state, the irradiation portion to separate the irradiation portion from the light absorption unit so as to set the second pressing force to zero.

4. The image forming apparatus according to claim 1, wherein the oscillator includes a semiconductor laser oscillation device.

5. An image forming method of forming an image on a workpiece by using an irradiation portion radiating a laser beam to an outside, the image forming method comprising;
   in an irradiation state in which the irradiation portion is radiating the laser beam, pressing the irradiation portion against a workpiece with first pressing force equal to or greater than 4.9 N, via a light absorption unit absorbing the laser beam and converting the laser beam to heat, and irradiating the workpiece with the laser beam; and
   in a non-irradiation state in which the irradiation portion is not radiating the laser beam, pressing the irradiation portion against the workpiece with second pressing force smaller than the first pressing force, or separating the irradiation portion from the light absorption unit so as to set the second pressing force to zero.

* * * * *